United States Patent
Stumpe et al.

[11] Patent Number: 5,984,433
[45] Date of Patent: Nov. 16, 1999

[54] METHOD AND DEVICE FOR ELECTRICALLY CONTROLLING OR ADJUSTING THE BRAKE SYSTEM OF A VEHICLE

[75] Inventors: Werner Stumpe, Stuttgart; Juergen Wrede, Bietigheim-Bissingen, both of Germany

[73] Assignee: Robert Bosch GmbH, Stuggart, Germany

[21] Appl. No.: 08/967,114

[22] Filed: Nov. 27, 1997

Related U.S. Application Data

[63] Continuation of application No. 08/548,024, Oct. 25, 1995, abandoned.

[30] Foreign Application Priority Data

Oct. 25, 1994 [DE] Germany ............................ 44 38 0178

[51] Int. Cl.[6] .................................................. B60T 8/58
[52] U.S. Cl. ........................................ 303/155; 303/113.4
[58] Field of Search ............................... 303/155, 113.4, 303/122.03, 122.04, 122.05, 122.11, 3, 15, 10, 20, 178, 183, 184, 171

[56] References Cited

U.S. PATENT DOCUMENTS

| | | |
|---|---|---|
| 4,677,557 | 6/1987 | Stumpe .................................... 364/426 |
| 4,685,745 | 8/1987 | Reinecke .................................. 303/300 |
| 4,850,650 | 7/1989 | Ecker et al. ......................... 303/155 X |
| 5,189,391 | 2/1993 | Feldmann et al. ....................... 340/453 |
| 5,219,212 | 6/1993 | Shimada et al. ......................... 303/148 |
| 5,378,052 | 1/1995 | Yoshino .............................. 303/155 X |

FOREIGN PATENT DOCUMENTS

| | | |
|---|---|---|
| 3313078 | 10/1984 | Germany . |
| 4131169 | 3/1993 | Germany . |

*Primary Examiner*—Lee W. Young
*Attorney, Agent, or Firm*—Fulbright & Jaworski, LLP

[57] ABSTRACT

A central control module generates nominal values for braking based on a pedal input value form a pedal sensor which detects actuation of the brake pedal by the driver, and sensor signals representing wheel speeds. First and second brake control modules transmit sensor signals to the central module, receive nominal values from the central module, and transmit nominal values to the actuators. The first brake control module receives the pedal input value from the pedal sensor directly, and calculates the nominal values as a function of the pedal input value when the central module has failed.

9 Claims, 5 Drawing Sheets

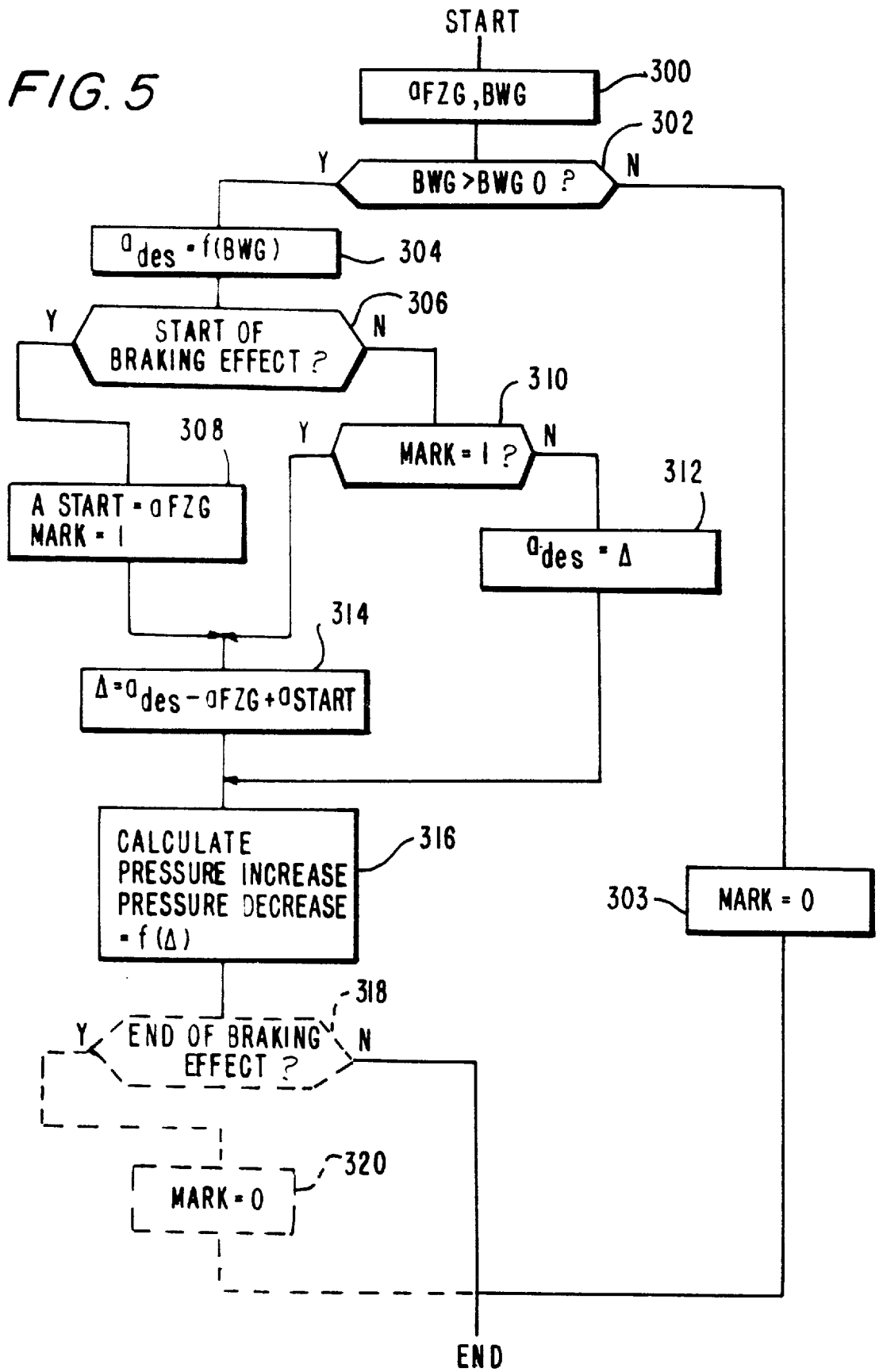

METHOD AND DEVICE FOR ELECTRICALLY CONTROLLING OR ADJUSTING THE BRAKE SYSTEM OF A VEHICLE

This application is a continuation of application Ser. No. 08/548,024, filed Oct. 25, 1995 now abandoned.

PRIOR ART

The invention relates to a method and a device for electronically controlling or adjusting the brake system of a vehicle.

Such a method or such a device is known from DE 41 31 169 A1. In this publication, the adjustment of the pressure in the individual wheel brakes is influenced in such a way that the vehicle reaches a prescribed desired deceleration value. Here, a deceleration signal transmitter which can be activated by the driver and a start of braking signal transmitter which can be activated by the driver are provided, the driver activating the brake signal transmitter, preferably a switch, at the start of braking. This triggers the storage of an initial value for the vehicle deceleration adjustment which is fixed at the value of the vehicle deceleration which is present at the start of braking signalled by the driver.

In general, in the case of electrically controlled or adjusted brake systems of vehicles it is desirable to use status variables of the vehicle and of the brakes for further use of these data as initial values or start values at the start of braking in the adjustment or control of the brake system during the braking process. The way, proposed in the above-mentioned patent application, of storing such status variables as a function of the signal of a start of braking signal transmitter which can be activated by the driver cannot be satisfactory. It is particularly disadvantageous that, independently of the activation of the brake pedal, the driver has to activate a further signal transmitter in order to ensure the optimum mode of operation of the brake system. In addition, in many traffic situations a driver will activate the start of braking signal transmitter early before the actual start of the braking process. Then, the stored status variables no longer reflect the current vehicle status or brake status.

Therefore, an object of the invention is to disclose measures for storing status variables at the start of the braking process without additional driver interventions or sensors, the stored variables preferably being as current as possible.

Further examples of the storage of status variables at the start of braking are known from the prior art. U.S. Pat. No. 4,677,557 describes the storage of a signal which corresponds to the static axle load at the start of braking, the stored signal being taken into account during the braking process for the identification of the brake pressure control signals. U.S. Pat. No. 4,685,745 discloses how the temperature of the brakes is stored at the start of the activation of the brakes by the driver and is taken into account during the control of the brake process, for example during the determination of the braking torques and for estimating the supply of energy and the stress margins of the friction brakes. U.S. Pat. No. 5,189,391 discloses how the rotational angle of the brake cam is detected at the start of the activation of the brakes which is also signalled by a signal transmitter which can be activated by the driver, in order to identify possible overloading of the brake and/or the absolute value of the readjustment of the brake system. All these known procedures have in common that the starting point for the detection of the status variables is fixed by the activation by the driver of a signal transmitter, for example the brake pedal. DE 33 13 078 A1 discloses how the residual thickness of brake lining of the brakes is detected at the start of braking. Here, a special sensor is used which produces a signal which represents the residual thickness of brake lining when there is mechanical contact between the brake block and the brake disk.

SUMMARY OF THE INVENTION

The signal which triggers the storage of vehicle status values is produced without additional outlay in the region of the electronic control unit of the brake system. It is particularly advantageous here that neither specially designed sensors nor an additional sensor which can be activated by the driver is used.

The procedure according to the invention also permits the storage of one or more status variables in the region of the time, or exactly at the time, at which the braking effect actually starts. As a result, the desired degree of updating of the stored status variables is achieved. This is of particular significance for the further adjustment of the braking process and/or for the monitoring of the braking process because the status of the vehicle and/or brake system present at the start of the actual braking effect can be used as the basis for the adjustment or control of the braking process.

BRIEF DESCRIPTION OF THE DRAWING

FIG. 5 is a flow diagram of a preferred procedure according to the invention.

DESCRIPTION OF EXEMPLARY EMBODIMENTS

Figure 1:
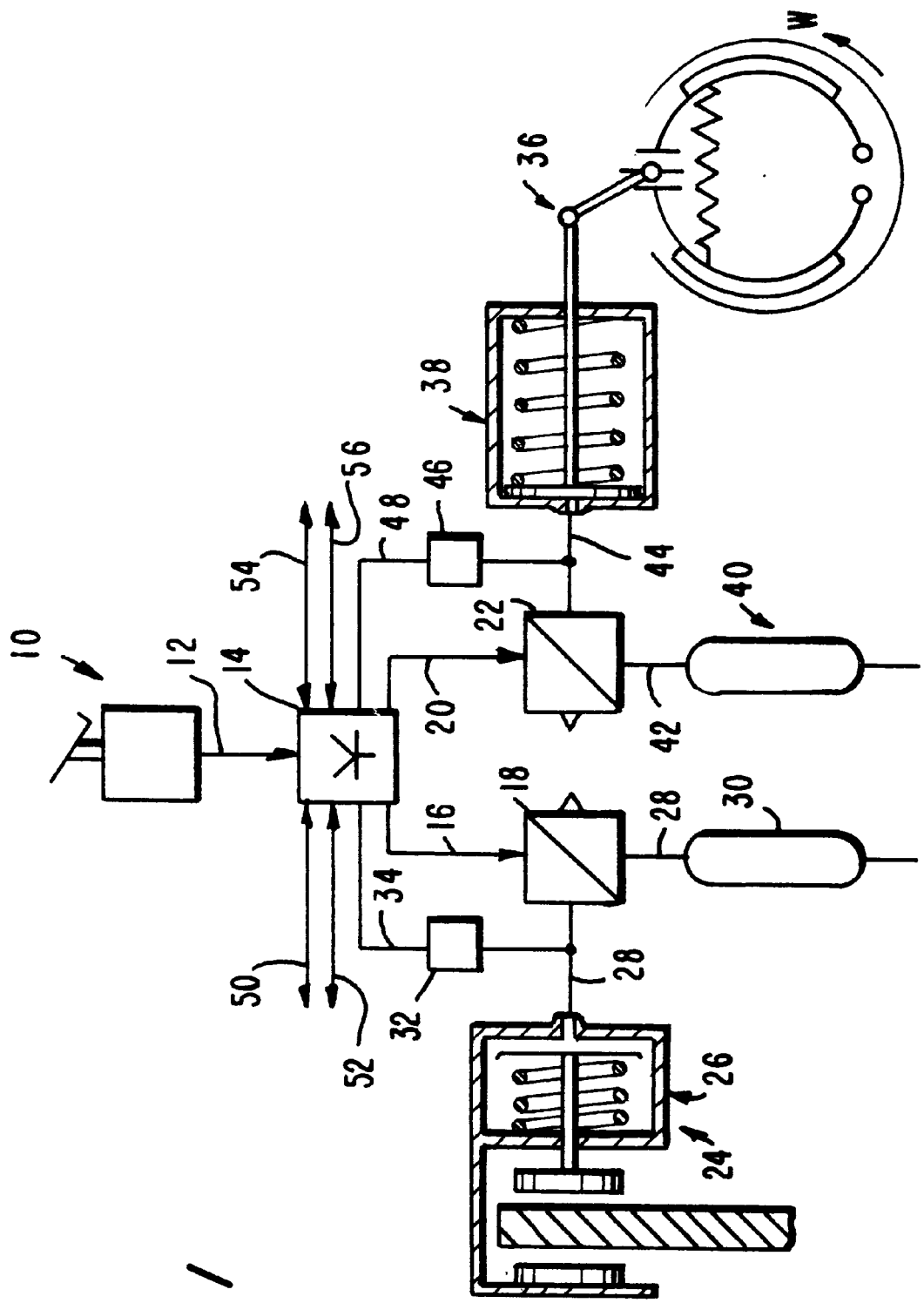
FIG. 1 is a diagram of an electrically controlled brake system.

FIG. 1 shows an overview circuit diagram of an electrically adjusted/controlled brake system. In a preferred exemplary embodiment this brake system comprises emergency brake or auxiliary brake circuits of a pneumatic or hydraulic nature, which is not shown in FIG. 1 for reasons of clarity. FIG. 1 shows a brake value transmitter 10 which can be activated by the driver and which is connected via a line 12 to an electronic control unit 14. The electronic control unit 14 is connected via a line 16 to a first pressure control valve 18 and via a line 20 to a second pressure control valve 22. In the preferred exemplary embodiment, the pressure control valve 18 controls the pressure in a disk brake 24 which is fed into the brake cylinder 26 of the disk brake 24 by the pressure control valve 18 via a hydraulic or pneumatic line 28 from an accumulator 30. The pressure in the line 28 and thus the braking pressure is detected by a pressure sensor 32 which is connected via the line 34 to the electronic control unit 14. In an analogous way, the pressure control valve 22 controls the brake pressure of a drum brake 36. The pressure control valve 22 feeds pressure from an accumulator 40 into the brake cylinder 38 via the pneumatic or hydraulic lines 42 and 44. A pressure sensor 46 detects the pressure in the line 44. The pressure sensor 46 is connected to the electronic control unit 14 via the line 48. In addition, further outlet and inlet lines 50, 52, 54 and 56 of the electronic control unit 14 are illustrated, via which lines 50, 52, 54 and 56 further operating variables of the motor vehicle or of the brake system are fed to the control unit and via which the electronic control unit controls the brakes of other wheels or other axles.

The described embodiment of the brake system having disk brake and drum brake is exemplary. In other exemplary embodiments it may be a case of brake systems which are completely equipped either with disk brakes or drum brakes. In one exemplary embodiment the pressure control valves are assigned to an axle of the vehicle, in others to the individual wheel brakes. In addition, instead of the electrical-pneumatic or electrical-hydraulic brake system a purely electrical brake system may be provided. Also, part of the electronic control unit 14 may be integrated into the pressure control valves 18, 22. The pressure sensors 32, 46 can then be integrated into the pressure control valves 18, 22 and exchange the pressure values with the electronic control unit 14 via a data bus.

In order to initiate a braking process, the driver activates the brake value transmitter 10. This converts the activation path or the activation force into an electrical signal which is fed to the electronic control unit 14. If the activation value of the brake value transmitter exceeds a predetermined threshold value, it is concluded that braking is taking place and the pressure control valves are actuated by the electronic control unit 14. In the case of a pneumatic brake system, the latter feed air to the brake cylinders 26 and 38 from the accumulators. The fed-in level of brake pressure is additionally monitored here by the pressure sensors 32 and 46 and the fed-in pressure value is transmitted to the electronic control unit 14. If the pressure is too high, pressure reduction signals are output by the control unit. By virtue of the fed-in pressure, the brake cylinders tension the friction brakes and the braking torque which is then effective reduces the rotational speed of the respective wheel. As a result, the vehicle is decelerated. The strategy according to which the electronic control unit 14 adjusts the supply of pressure to the brake cylinders can be of various kinds. In the preferred exemplary embodiment, the feeding in of pressure into the brake cylinders is carried out in terms of adjusting the vehicle deceleration to a predetermined desired value. In addition, in other advantageous exemplary embodiments the electronic control unit 14 can adjust the brake pressure to a predetermined desired value or the braking torque to a predetermined desired value. In the case of such adjustments, the respective desired value (deceleration, braking pressure, braking torque) of the degree of activation of the braking value transmitter 10 is determined by the driver by means of predetermined characteristic curves or diagrams. In addition, the feeding in of pressure can be controlled with a view to an adjustment, which complements the actual braking process, of the coupling force between a towing vehicle and a trailer, the axle loads, the temperature of the brakes and/or the adhesion or the slip between the wheel of the vehicle and the roadway. Such adjustments are known from the prior art, e.g. U.S. Pat. No. 5,344,222.

Figure 2A:
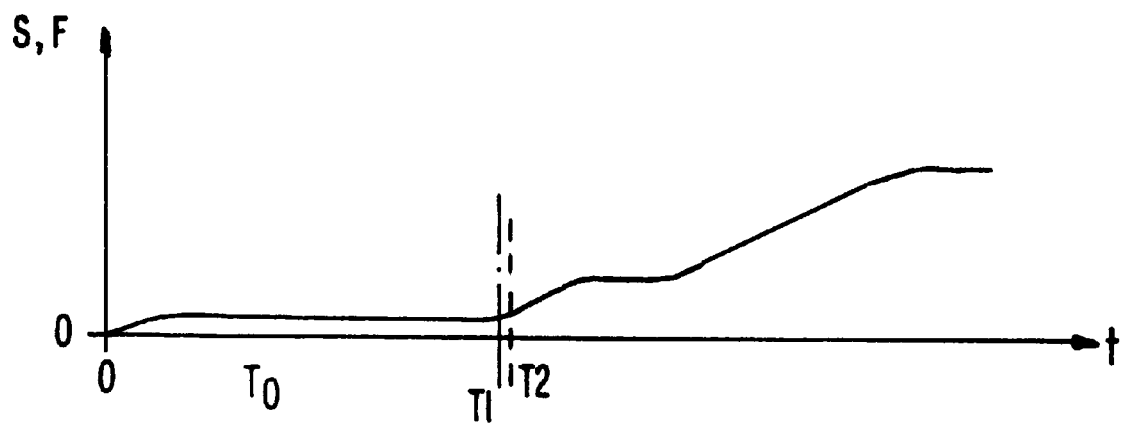
FIG. 2a) is a plot of brake pedal force or displacement vs. time.
Figure 2B:
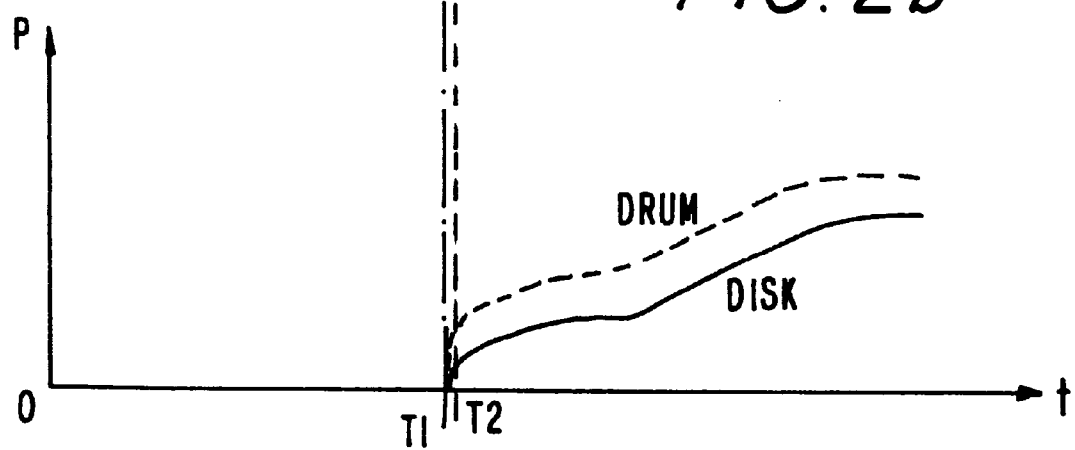
FIG. 2b) is a plot of the corresponding pressure at the brake vs. time.
Figure 2C:
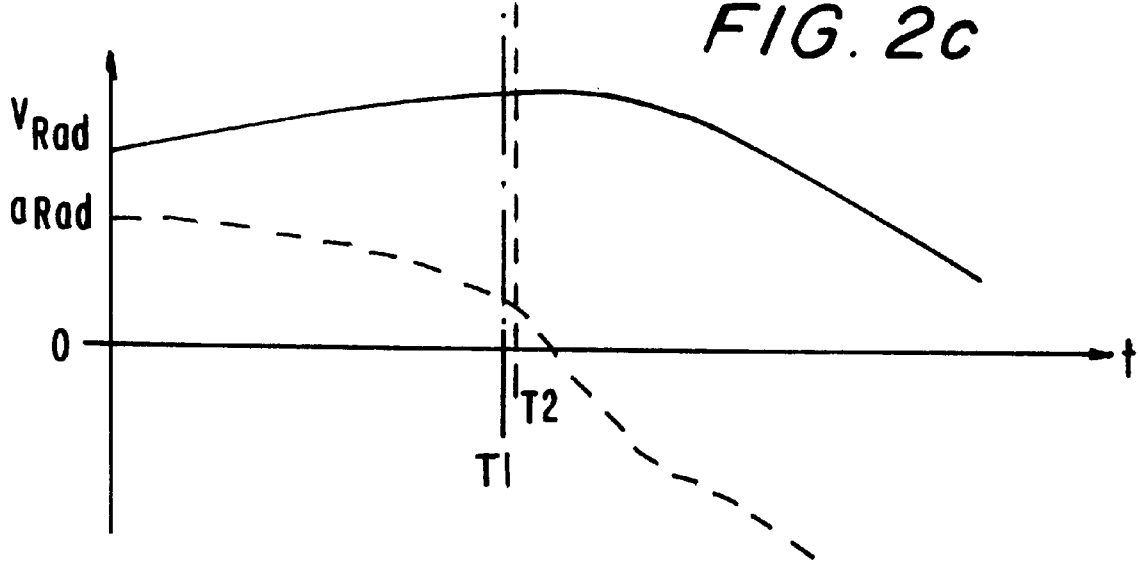
FIG. 2c) is a plot of the corresponding wheel velocity and wheel acceleration vs. time.

In FIG. 2, a braking process is illustrated with reference to timing diagrams. Here, FIG. 2a shows by way of example the temporal profile of the activation of the brake pedal, FIG. 2b shows the profile of the fed-in pressure and FIG. 2c shows the profile of the speed and acceleration of a wheel or of the vehicle. At the time T0 the driver activates the brake pedal as illustrated in FIG. 2a. The brake pedal goes into the ready to brake mode. At the time T1 the driver initiates the actual braking process by further activation of the brake pedal. The electronic control unit 14 forms a desired value for the brake pressure to be fed in, the braking torque to be applied or the vehicle deceleration to be set from the brake signal value (position signal or force signal) supplied to it. At the time T1 at which the driver carries out the activation of the brake pedal in order to initiate a braking process and the brake signal value exceeds the threshold value which has been set, the electronic control unit begins to feed pressure into the brake cylinder of the wheels. Here, an individually adapted characteristic curve, which describes the assignment between the desired value prescribed by the driver and the actually fed-in pressure value is provided for each wheel brake. As illustrated in FIG. 2b, the brake pressure increases slowly at the time T1. Here, the temporal behavior of the brake pressure of the disk brake is illustrated as an unbroken line and the temporal behavior of the brake pressure of the drum brake is illustrated as a broken line. Correspondingly, FIG. 2c shows the reaction of the vehicle by means of the wheel speed and wheel acceleration. When there is little wheel slip, these correspond to the speed or acceleration of the vehicle and up to the time T1 they behave according to the dynamic conditions prescribed by the driver. In the example shown, the wheel speed increases slightly, for example as a result of travelling downhill, while the wheel acceleration decreases over time since the driver has released the accelerator pedal in the example shown. At the time T1 the braking process begins. However, an effect on the vehicle itself cannot be detected until the time T2. This time forms the start of the braking effect at which the speed or acceleration of the vehicle decreases as a result of the engaging friction brakes. It is noticeable here that, in particular with regard to the wheel acceleration, there is a considerable difference between the time of activation of the brake pedal (T0) and the starting of the braking effect (T2). In FIG. 2c the acceleration is plotted. If the deceleration of the vehicle is calculated in a corresponding way, the value before the time T1 is negative and it is positive when the value drops below the time axis.

According to the invention, at the time (T2) when the braking effect starts the desired status variables are stored and taken into account for the adjustment or control of the subsequent braking process.

The start of the braking effect can be fixed here in different ways. In the preferred exemplary embodiment in the case of a deceleration-adjusted brake system, the start of the braking effect is detected, as explained in greater detail below, when pressure is first fed into the brake cylinders in terms of an increasing braking pressure. In other advantageous exemplary embodiments the start of the braking effect is identified with reference to the temporal profile of the braking pressure (evaluation of the bend in the line at time T2) or the temporal profile of the wheel speed or acceleration. Here, the start of the braking effect is detected when the profile of the rotational speed signal has a bend and/or the first temporal derivation of the rotational speed signal (the acceleration) has an erratic profile and/or the second temporal derivation of the rotational speed signal has a maximum value (cf. FIG. 2c). Correspondingly, the end of the braking effect when the brake is released is detected on the basis of the rotational speed signal and/or the pressure signal (pressure signal is essentially constant, the wheel speed is essentially constant, the acceleration is essentially zero and/or the jump in the second temporal derivation of the speed). In another advantageous exemplary embodiment the start of the braking effect is derived from the reaction of the body of the vehicle during the braking process. Here, the supporting forces of the body of the vehicle on the axle are identified during the braking process, preferably the pressure in at least one spring element of the vehicle or the difference pressure between the pressures in both spring elements of a wheel. The start of the braking effect is then detected when there is an increase in the pressure or the difference pressure.

In the preferred exemplary embodiment of the deceleration-adjusted bras system, at the start of the braking effect the vehicle deceleration which is present then is stored so that a current initial value is acquired for the deceleration adjustment. In addition, in an advantageous exemplary embodiment for the improved control/adjustment of the braking process in accordance with the prior art mentioned at the beginning a measure of the axle load, the temperature of the brakes, the rotational angle of the brake shaft, the degree of wear of the brake linings and/or the coupling forces between the parts of the vehicle are stored at the start of the braking effect and taking into account during the subsequent control of the brake system.

Figure 3:
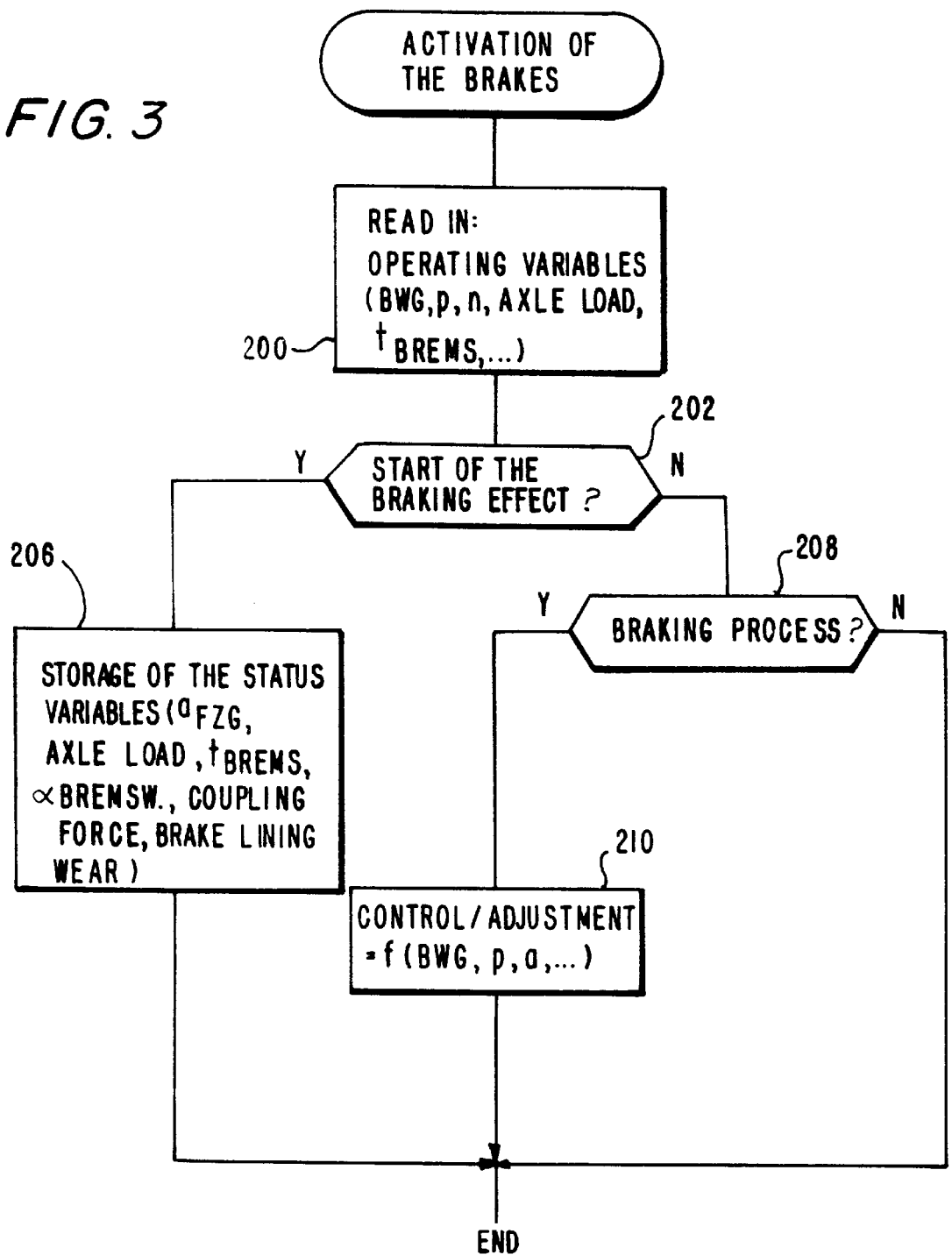
FIG. 3 is a flow diagram of the basic procedure according to the invention.

The procedure according to the invention is preferably implemented as a computing program. Such an implementation of the basic idea is described in FIG. 3 by means of a flow diagram. After the program part starts at prescribed times with the brake pedal activated, in the first step 200 operating variables such as brake signal value BWG, wheel brake pressure p, wheel speed n, axle load, brake temperature, rotational angle of the brake shaft, coupling force etc are read in. Subsequently, in step 202 it is checked whether a start of the braking effect has been detected. If this is the case, in step 206 the status variables to be respectively stored are stored. In the preferred exemplary embodiment this is the deceleration of the vehicle and in other exemplary embodiments these could be, as an alternative or supplement, the axle load, the temperature of the brakes, the rotational angle of the brake shaft, the wear of the brake linings and the coupling force between the towing vehicle and trailer. Subsequently, the program part is terminated. If there is no start of braking effect present, in step 208 it is checked whether a braking process is being carried out. This takes place preferably by checking a mark which is set when the start of braking effect is detected and is reset when the brake is released. If there is no braking process taking place, the brake system is in the "ready to brake mode" and the program part is terminated. If the vehicle is in the braking process, according to step 210 the brake system is adjusted/controlled on the basis of one or more operating variables such as are known in principle from the prior art.

In addition to the illustrated storage of the deceleration of the vehicle as a starting variable for a deceleration adjustment, the stored status variables are also stored in conjunction with braking pressure adjustments or braking torque adjustments. In addition, the braking process can be monitored on the basis of the stored status variables, for example it is detected that deviations have been exceeded since the start of the braking effect. In addition, the stored status variable serves in advantageous exemplary embodiments as a standby variable in the case of known faults occurring during the braking process.

Figure 4:
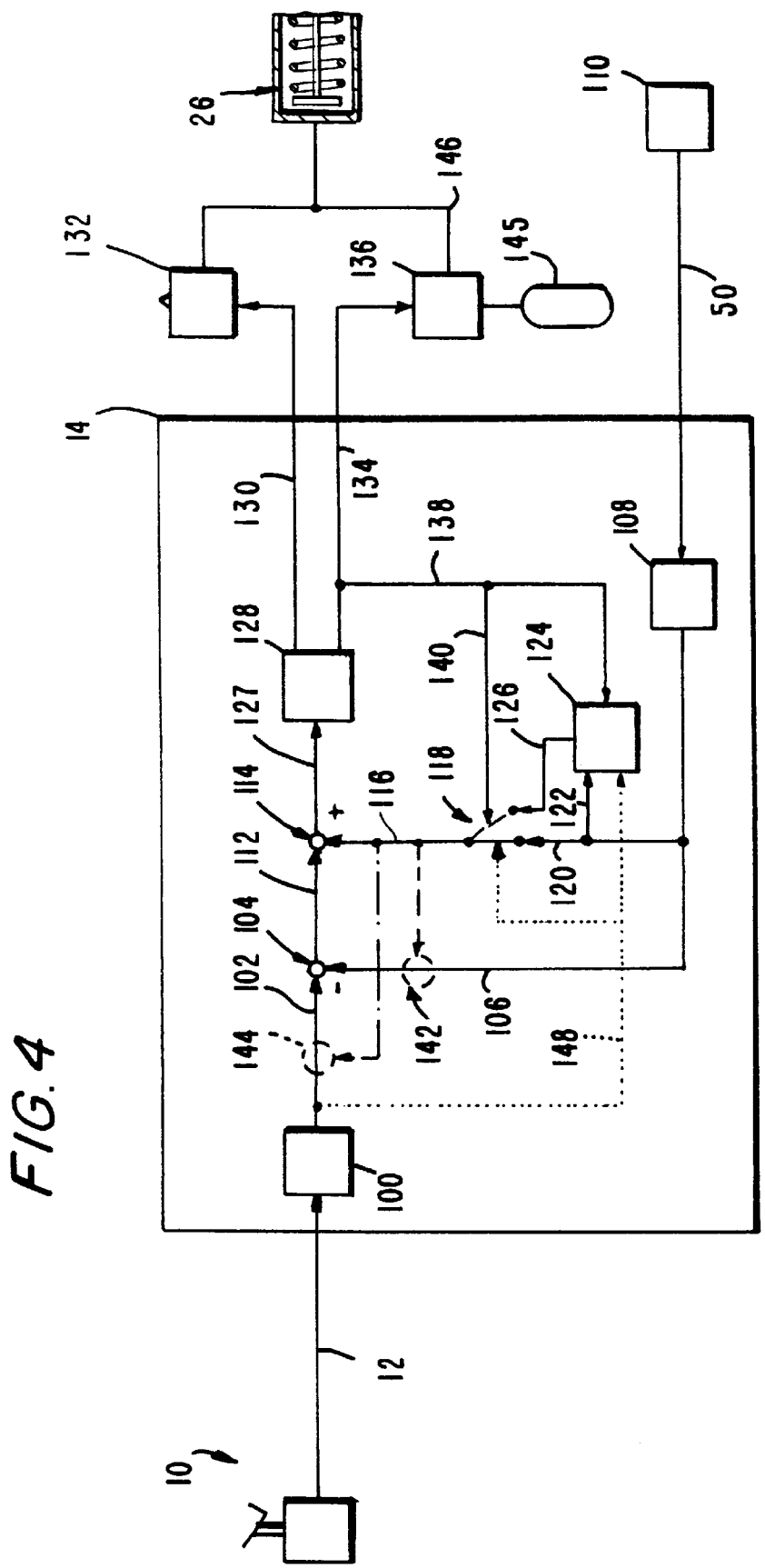
FIG. 4 is a diagram illustrating several preferred embodiments of apparatus according to the invention.

In FIG. 4 an overview block circuit diagram of a preferred exemplary embodiment is illustrated in a simplified form. In the electronic control unit 14 the line 12 is led from the brake value transmitter 10 to a processing stage 100. The output line 102 of the processing stage 100 leads to a comparison stage 104. In addition to the line 102, the line 106 is led from the comparison stage 104 to a processing stage 108 to which in turn the line 50 is led from a wheel speed sensor 110. The output line 112 of the comparison stage 104 leads to the second comparison stage 114. The line 116 is led to the second comparison stage 114 from a switching element 118. The line 120 is led to the switching element 118 from the line 106. A line 122 leads from the line 120 to a storage element 124. The output line 126 of the latter leads to the second input of the switching element 118. A line 127 leads from the comparison stage 114 to an adjustment stage 128. An output line 130 leads from this adjustment stage 128 to a pressure-reducing valve 132, and an output line 134 leads to a pressure-increasing valve 136 which controls the pressure from a reservoir vessel 145 via a line system 146 in the brake cylinder 26. A line 138 leads to the storage unit 124 from the line 134. A line 140 for activating the switching element 118 leads from this line 138. In a preferred exemplary embodiment, the functions of the valves 132 and 136 are combined in a pressure control valve (cf. FIG. 1, valve 18).

In addition to this preferred embodiment, in FIG. 4 three alternatives are shown. Firstly, as indicated as broken lines, the line 116 is led to a comparison point 142 which is inserted into the line 106 instead of the comparison point 114. In a further exemplary embodiment (dot-dash line) instead of the comparison stage 114 a comparison stage 144 is inserted into the line 102 and the line 116 is led to the comparison stage 144. In the variant of the exemplary embodiment represented by dotted lines a line 148 leads from the line 102 to the storage element 124 and to the switching element 118. This line replaces the lines 138 and 140.

In order to adjust the brake system, the fed-in brake signal value is subjected to a threshold value comparison and when the threshold value is exceeded a desired deceleration of the vehicle is read out of a characteristic curve or table. The relationship between the desired deceleration and brake signal value is preferably linear here. The desired deceleration value $\alpha_{des}$ formed in this way is compared in the comparison point 104 with the actual value of the vehicle deceleration $a_{act}$, fed in via the line 106. The vehicle deceleration signal is calculated here in the processing stage 108 from the vehicle speed from block 110 or the wheel speed by means of differentiation or by means of comparison of two successive speed values. The difference signal between the desired deceleration and actual deceleration is output to the comparison stage 114. Here, the value present on the line 116 is added to the difference. The control error corrected in this way is fed via the line 127 to the controller unit 128. This controller unit comprises a controller, in the simplest example a two-point controller, in other exemplary embodiments a controller with proportional, integral or differential behavior, the controller producing actuation signals for the valves 132 and 136 or for the valve 18 on the basis of the control error. If the vehicle deceleration is smaller in terms of its absolute value than the desired value, the valve 136 is actuated by the controller 128 in terms of increasing pressure in the brake cylinder, while in the event of the vehicle deceleration being greater in terms of its absolute value than the desired deceleration the controller unit 128 actuates the valve 132 in order to decrease pressure in the brake cylinders of the wheel brakes. During normal operation, outside the braking process, the switching element 118 is in the position shown by an unbroken line. In this case, the calculated vehicle acceleration or deceleration in the comparison point 114 is added to the control difference. This compensates the actual value of the vehicle deceleration so that outside the activation of the brakes the value 0 is fed to the controller unit 128 at the start of the activation of the brakes. At the start of the braking effect, the controller unit 128 actuates the inlet valve 136. This signal leads, via the line 138, to the current vehicle deceleration being stored in the element 124 and to the switching element 128 switching over. During the braking process, the stored vehicle deceleration value is therefore added to the control error at the start of the braking effect as a start of deceleration value in the comparison point 114. The stored start value therefore corresponds to the vehicle deceleration present before the friction brakes also come into effect. At the end of the braking process, the switch 118 is switched again into the position shown by an unbroken line. The end of the braking effect is then considered to be terminated if the inlet valve 136 is no longer actuated via the line 134 or the outlet valve 132 is completely opened.

In addition to the embodiment illustrated, the start value for the deceleration of the vehicle can be added to the desired deceleration value instead of to the control error (comparison point 144). Alternatively, the start value can be subtracted from the actual deceleration value in the comparison point 142. Here, in the second alternative the change in the deceleration of the vehicle since the start of the braking effect is identified or, in accordance with the first alternative, the desired value is corrected by the deceleration at the start of the braking effect.

In a further advantageous alternative, the start of the braking effect or the end of the braking effect is not derived from the actuation signals for the inlet valve 136 but rather from the desired value. For this purpose, the start of the braking effect is detected at the first occurrence of a desired value on the line 102. This fact leads via the line 148 to the storage of the start value in element 124 and to the switching of the switching element 118. The end of the braking effect is detected when the desired value signal disappears, in response to which the switching element switches into the position shown by an unbroken line.

In FIG. 5, a flow diagram is shown as an implementation example of the exemplary embodiment illustrated in FIG. 4.

After the start of the program part at prescribed times, in the first step 300 the brake signal value BWG, the vehicle acceleration aFZG and, if appropriate, further operating variables are read in. Subsequently, in the interrogation step 302 it is detected whether a brake pedal activation is taking place. This is the case if the brake value is greater than a prescribed threshold value BWGO. If this is not the case, i.e. if no activation of the brakes is taking place, in step 303 a mark which characterizes the start of the braking effect is set to the value zero and the program part is terminated. If activation of the brakes was detected in step 302, in step 304 the desired deceleration value $a_{des}$ is identified on the basis of the brake value BWG by means of a prescribed characteristic curve or table. If appropriate, further operating variables, such as the weight of the vehicle, the status of the brakes etc., are taken into account here. Subsequently, in step 306 it is interrogated by means of the procedures designated above, in particular by checking the pressure increase signal, the wheel speed signals and/or the behavior of the body of the vehicle, whether the start of the braking effect is detected in the current program run. If this is the case, according to step 308 the current vehicle deceleration is stored as a start value $a_{start}$ and the mark is set to the value 1. If it is detected in step 306 that the start of the braking effect is not detected in the current program run, according to step 310 it is checked whether the mark is at the value 1. If this is not the case, a braking effect has still not occurred. In step 312, the control error Δ is therefore set to the desired deceleration value $a_{des}$. If the mark has the value 1, the vehicle is therefore braked, and in step 314, which is also carried out after step 308 the control error Δ is calculated from the difference between the desired deceleration value $a_{des}$ and the sum of the actual deceleration value $a_{FZG}$ and the stored start value $a_{start}$. Subsequently, in step 316 the pressure increase signals or pressure decrease signals are determined on the basis of the control error and the program part is terminated. In an advantageous exemplary embodiment, after step 316 the end of the braking effect is detected in step 318 on the basis of the pressure increase signal or the other abovementioned signals. If the end of the braking effect has not occurred, the program part is terminated, and otherwise the mark is set to the value 0 (step 320) and the program part is terminated.

In addition to the use, described from the prior art mentioned at the beginning and with reference to a preferred exemplary embodiment, of the stored status variables it is particularly advantageous to utilize the stored status variables for monitoring the brake system during the braking process. For this purpose, the currently measured status variable is compared with the stored one and in the case of unacceptable deviations a fault is detected. This is particularly advantageous in the case of monitoring of the braking effect by monitoring the wheel speeds, the braking pressure, etc. In addition, in a particularly advantageous embodiment, in the event of a sensor failing the measurement variable stored at the start of the braking effect with the sensor intact is used as a standby variable for the braking process. This is particularly advantageous during the detection of variables which represent a parameter of the brake system which changes only slowly, such as the wear of the brake linings or the rotational angle of the brake shaft, or in the case of variables which represent a parameter, such as the coupling force, which is secondary for the control or adjustment of the brake system.

We claim:

1. Method for electronically controlling the wheel friction brakes of a vehicle, said method comprising
    measuring at least one operating variable of the vehicle, which operating variable changes characteristically when a braking effect begins, said braking effect being caused by activation of at least one wheel brake to a degree such that the respective brake engages;
    evaluating said at least one operating variable, detecting a beginning of the braking effect, when said operating variable changes characteristically, the beginning of the braking effect corresponding to the engagement of at least one wheel friction brake;
    measuring at least one vehicle status variable;
    storing said at least one status variable when said beginning of brake effect is detected; and
    controlling the wheel brakes based on said at least one status variable in storage.

2. Method as in claim 1 wherein said vehicle status variable is one of vehicle deceleration, axle load, rotational angle of the brake cam, wear of brake lining, and coupling force between parts of the vehicle.

3. Method as in claim 1 wherein said operating variable is one of brake pressure increase, values set by the driver, brake pressure, wheel speed, and movement of the vehicle body.

4. Method as in claim 1 comprising
    forming a desired vehicle deceleration as a function of said at least one operating variable;
    forming an actual vehicle deceleration from said at least one status variable and said operating variable; and
    controlling said wheel brakes by adjusting said at least one operating variable so that said actual vehicle deceleration conforms to said desired vehicle deceleration.

5. Method as in claim 4 wherein said desired vehicle deceleration is formed as a function of the degree of activation of the brake pedal.

6. Method as in claim 4 wherein the actual vehicle deceleration is stored as said status variable when said beginning of braking effect is detected.

7. Method as in claim 1 further comprising detecting faults using said at least one stored status variable.

8. Method as in claim 7 wherein a plurality of status variables are stored, at least one of said variables being used as a standby variable for controlling said vehicle brakes when a fault is detected.

9. Apparatus for electronically controlling the wheel friction brakes of a vehicle, said apparatus comprising means for measuring at least one operating variable of the vehicle, which operating variable changes characteristically when a braking effect begins, said braking effect being caused by actuation of at least one wheel brake to a degree such that the respective friction brake engages;

means for evaluating said at least one operating variable;

means for detecting the beginning of the braking effect, when said operating variable changes characteristically, the beginning of the braking effect corresponding to the engagement of the friction brake;

means for measuring at least one vehicle status variable;

means for storing said at least one status variable when said beginning of braking effect is detected; and means for controlling the wheel brakes based on said at least one status variable in storage.

* * * * *